(12) United States Patent
Kinouchi (10) Patent No.: US 11,250,302 B1
(45) Date of Patent: Feb. 15, 2022

(54) IMAGE FORMING APPARATUS AND CONTROL METHOD OF IMAGE FORMING APPARATUS

(71) Applicant: TOSHIBA TEC KABUSHIKI KAISHA, Tokyo (JP)

(72) Inventor: Satoshi Kinouchi, Tokyo (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 17/016,060

(22) Filed: Sep. 9, 2020

(51) Int. Cl.
*G03G 15/20* (2006.01)
*G06K 15/00* (2006.01)
*G06K 15/14* (2006.01)
*G03G 15/00* (2006.01)

(52) U.S. Cl.
CPC ....... *G06K 15/408* (2013.01); *G03G 15/2039* (2013.01); *G03G 15/553* (2013.01); *G06K 15/002* (2013.01); *G06K 15/14* (2013.01); *G06K 2215/0085* (2013.01)

(58) Field of Classification Search
CPC .... G06K 15/408; G06K 15/002; G06K 15/14; G06K 2215/0085; G03G 15/2039; G03G 15/553; G03G 15/5079; G03G 15/55; G06F 11/079
See application file for complete search history.

(56) References Cited

U.S. PATENT DOCUMENTS

2005/0262394 A1* 11/2005 Yasukawa ........... G06F 11/0733
714/23
2008/0068639 A1* 3/2008 Satoh ..................... G06K 15/02
358/1.14

FOREIGN PATENT DOCUMENTS

JP 2011-197423 A 10/2011
JP 2019-012172 A 1/2019

\* cited by examiner

*Primary Examiner* — Iriana Cruz
(74) *Attorney, Agent, or Firm* — Foley & Lardner LLP (57) ABSTRACT

An image forming apparatus includes a fixing device having a fixing belt assembly including a heater, a fixing belt, a heater temperature sensor, and a belt temperature sensor, and a pressure roller; a drive current sensor; and a life information acquisition portion. The heater temperature sensor detects the temperature of the heater. The belt temperature sensor detects the temperature of the fixing belt. The pressure roller presses against the fixing belt. The drive current sensor detects a drive current of a drive motor that drives the pressure roller. The life information acquisition portion acquires life information of the fixing belt assembly. A controller selects a failure prediction processing mode based on the detection result of the drive current sensor and selects a driving method based on the detection results of the temperature sensors and the acquisition result of the life information acquisition portion in each mode.

15 Claims, 9 Drawing Sheets

IMAGE FORMING APPARATUS AND CONTROL METHOD OF IMAGE FORMING APPARATUS

FIELD

Embodiments described herein relate generally to an image forming apparatus and a control method of the image forming apparatus.

BACKGROUND

In the related art, an electrophotographic image forming apparatus includes a fixing device that fixes a toner onto a sheet by heating the toner. In a fixing device of the related art, the occurrence of an abnormality is determined based on load torque of a drive motor that drives a pressure roller that pressurizes a fixing belt, and when it is determined that the abnormality occurs, an alarm is issued. However, the determination based on only the load torque of the drive motor as in the fixing device described above has a problem that various situations of the fixing device cannot be accurately detected.

DETAILED DESCRIPTION

In general, according to at least one embodiment, an image forming apparatus including a fixing device that includes a fixing belt unit including a heater portion, a fixing belt, a heater temperature detection portion, and a belt temperature detection portion, and a pressure roller; a current detection portion; a life information acquisition portion; and a control unit. The heater temperature detection portion detects the temperature of the heater portion. The belt temperature detection portion detects the temperature of the fixing belt. The pressure roller presses against the fixing belt of the fixing belt unit to form a nip. The current detection portion detects a drive current of a drive portion that drives the pressure roller. The life information acquisition portion acquires life information of the fixing belt unit of the fixing device. The control unit selects a first failure prediction processing mode or a second failure prediction processing mode of predicting a failure of the fixing device based on the detection result of the current detection portion and selects and executes a driving method based on the detection results of the heater temperature detection portion and the belt temperature detection portion and an acquisition result of the life information acquisition portion in each of the first failure prediction processing mode and the second failure prediction processing mode.

Hereinafter, a paper feed device and an image forming apparatus according to an embodiment will be described with reference to the accompanying drawings. In each figure, the same configurations are designated by the same reference numerals.

Figure 1:
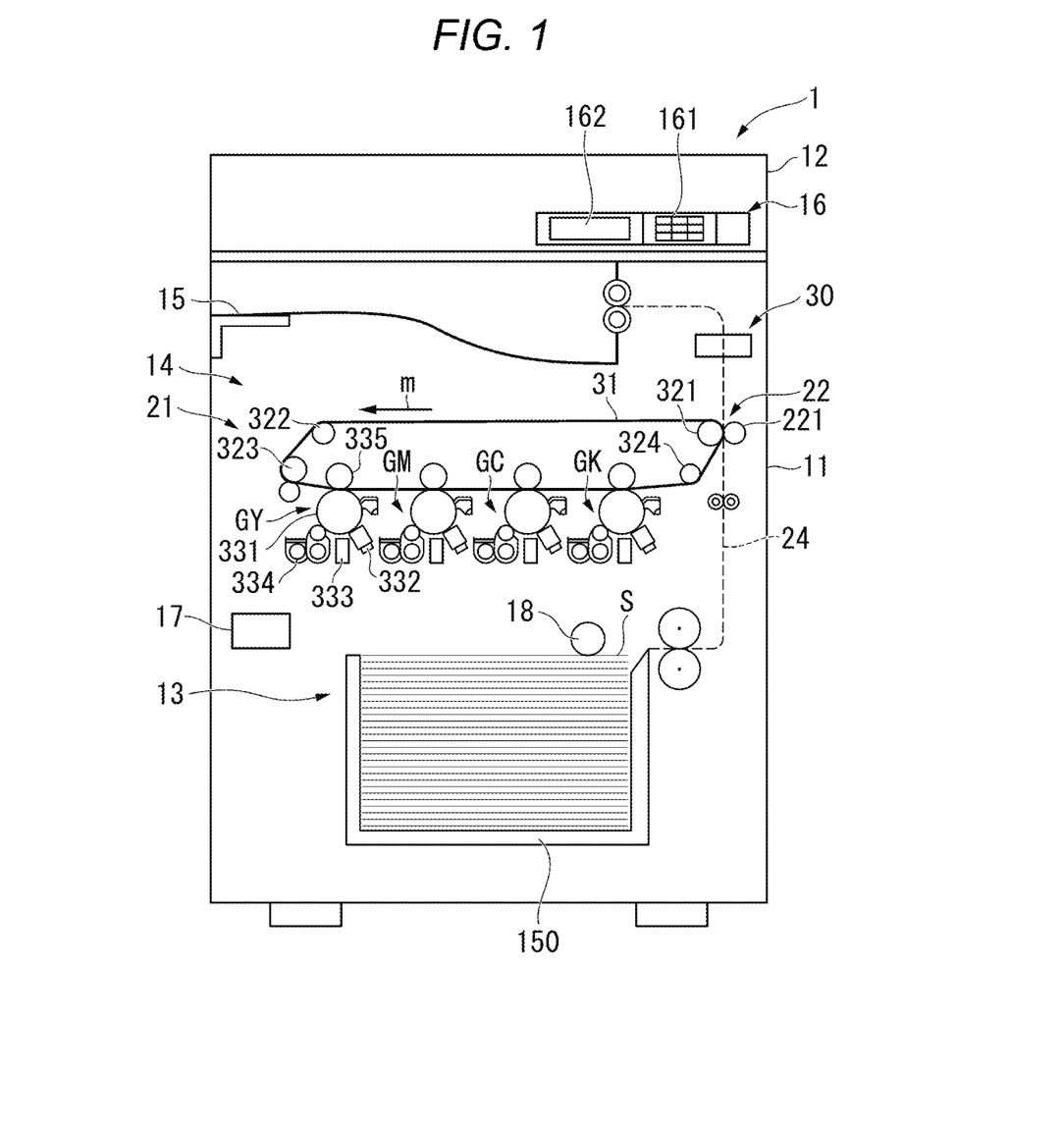
FIG. 1 is a front view illustrating an overall configuration of an image forming apparatus of an embodiment.

FIG. 1 is a front view illustrating an overall configuration of the image forming apparatus of at least one embodiment. For example, an image forming apparatus 1 is a multi-function peripheral (MFP). However, the image forming apparatus 1 is not limited to the example described above and may be a copying machine, a printer, a scanner, and/or a facsimile machine. As illustrated in FIG. 1, the image forming apparatus 1 includes a housing 11, a scanner unit 12, a sheet supply unit 13, a printer unit 14, a sheet discharge unit 15, and a control panel 16.

The housing 11 or chassis forms an outer shell of the image forming apparatus 1. The housing 11 stores the scanner unit 12, the sheet supply unit 13, and the printer unit 14.

The scanner unit 12 (e.g., a scanner, an image capturer, etc.) reads an image to be read based on brightness and darkness of light. The scanner unit 12 generates and records image information indicating the read image. The scanner unit 12 outputs the generated image information to the printer unit 14. The recorded image information may be transmitted to an external device or the like through a network.

The sheet supply unit 13 (e.g., a sheet storage assembly, a sheet dispenser, sheet supplier, etc.) supplies a sheet S, which is a sheet-shaped recording medium, such as paper or the like, to a conveyance path 24 one by one at the timing when the printer unit 14 forms a toner image. The sheet supply unit 13 of at least one embodiment includes a sheet feed cassette 150 for storing the sheets S. The sheet feed cassette 150 is attached to the housing 11 illustrated in FIG. 1 so as to be pulled out. The sheet feed cassette 150 stores a plurality of sheets S. The sheet supply unit 13 picks up the sheets S one by one by a pickup roller 18 and supplies each sheet S to the conveyance path 24.

The sheet supply unit 13 supplies a predetermined sheet S from the sheet feed cassette 150 to the conveyance path 24 in response to an instruction from a control unit 17. The sheet supply unit 13 may include a plurality of sheet feed cassettes 150. Different types of sheets S may be stored in the respective sheet cassettes 150.

The printer unit 14 (e.g., a printer) forms a toner image on the sheet S supplied from the sheet supply unit 13. The printer unit 14 forms the toner image, which is an output image, on the sheet S with a recording material such as a toner based on image information acquired from the scanner unit 12 or an external device.

In at least one embodiment, for convenience of description, an intermediate transfer type printer unit 14 is taken as an example for description. However, the configuration of at least one embodiment is also applicable to an image forming apparatus including a direct transfer type image forming unit. The printer unit 14 includes an intermediate transfer unit 21, a secondary transfer unit 22, a fixing device 30, and the conveyance path 24.

The intermediate transfer unit 21 includes an intermediate transfer belt 31, a plurality of rollers 321, 322, 323, and 324, and a plurality of image forming units GY, GM, GC, and GK. The intermediate transfer belt 31 is formed in an endless shape (i.e., is continuous). The plurality of rollers 321, 322, 323, and 324 support the intermediate transfer belt 31. With this configuration, the intermediate transfer belt 31 can run endlessly in a direction indicated by an arrow m in FIG. 1.

The plurality of image forming units GY, GM, GC, and GK include a yellow image forming unit GY, a magenta image forming unit GM, a cyan image forming unit GC, and a black image forming unit GK. Each of the image forming units GY, GM, GC, and GK includes a photosensitive drum 331, a charger 332, an exposure unit 333, a developing device 334, and a transfer roller 335. Each of the image forming units GY, GM, GC, and GK transfers the toner image formed on the surface of the photosensitive drum 331 to the intermediate transfer belt 31.

The secondary transfer unit 22 includes a transfer roller 221. The transfer roller 221 contacts the outer surface of the intermediate transfer belt 31. One belt roller 321 that supports the intermediate transfer belt 31 is included in the components of the secondary transfer unit 22. The sheet S is pinched between the transfer roller 221 and the belt roller 321 together with the intermediate transfer belt 31. Thereby, the toner image on the intermediate transfer belt 31 is transferred to the sheet S.

The fixing device 30 heats and pressurizes the toner image transferred to the sheet S to fix the toner image on the sheet S. Details of the fixing device 30 will be described later.

The conveyance path 24 extends from the sheet supply unit 13 to the sheet discharge unit 15 through the secondary transfer unit 22 and the fixing device 30. While the sheet S is conveyed on the conveyance path 24, the sheet S moves from the sheet supply unit 13 to the sheet discharge unit 15 through the secondary transfer unit 22 and the fixing device 30. The sheet discharge unit 15 discharges the sheet S on which the image is formed by the printer unit 14.

The control panel 16 (e.g., a user interface, an operator interface, an input/output device, etc.) includes a panel 161 and a display 162. The panel 161 receives input of various operation instructions (e.g., from a user). The display 162 is an image display device such as a liquid crystal display (LCD) or an organic electro luminescence (EL) display. The display 162 displays various types of information about the image forming apparatus 1. The display 162 displays an operation mode of the image forming apparatus 1 selected by the user, for example. In this embodiment, the control panel 16 is an example of an "input portion".

The image forming apparatus 1 designates an operation mode by, for example, performing an operation input by pressing an input button or the like provided on the panel 161. Alternatively, the user may designate an operation mode of the image forming apparatus 1 by, for example, performing an operation input by tapping an icon or the like displayed on a touch panel in which the display 162 and the panel 161 are integrally configured. The control unit 17 controls each unit of the image forming apparatus 1. The details of the control unit 17 will be described later.

Figure 2:
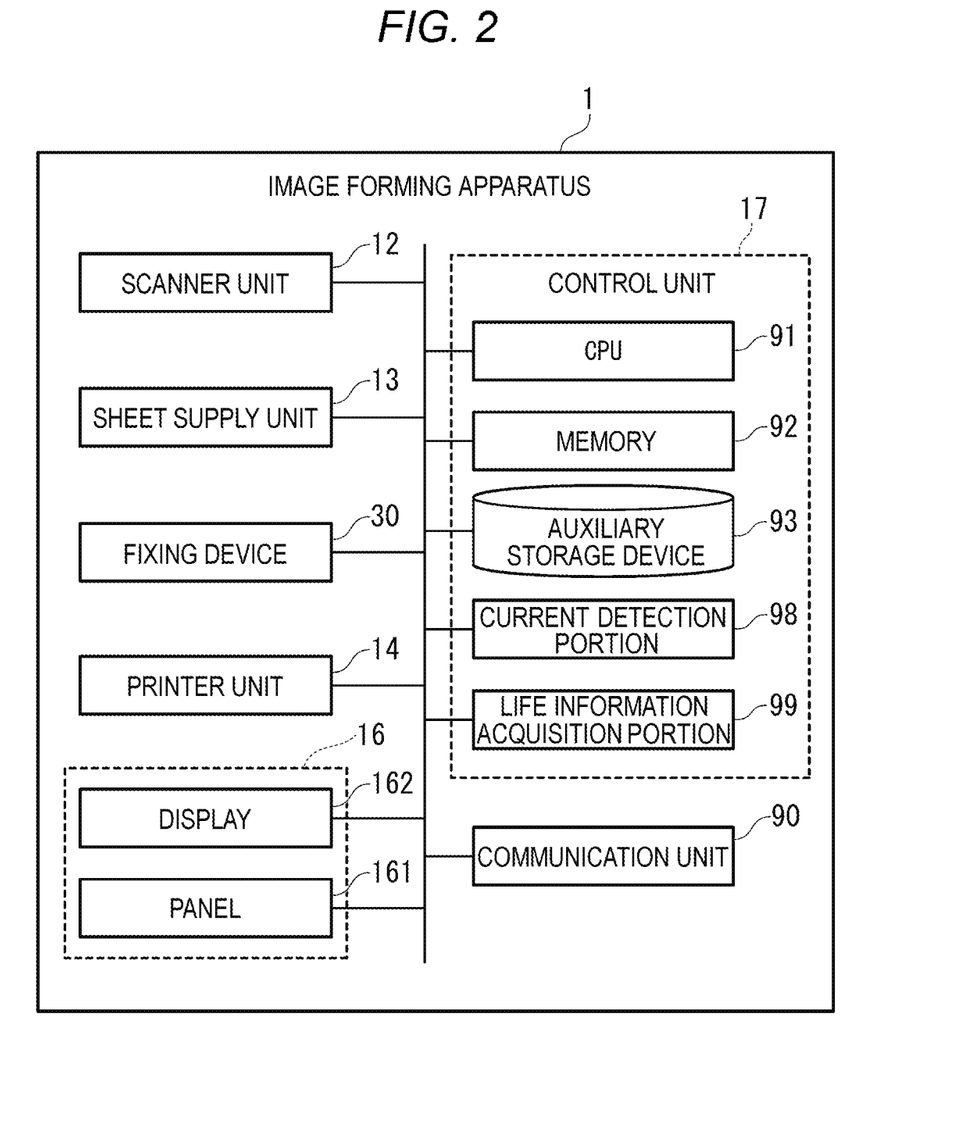
FIG. 2 is a diagram illustrating a hardware configuration of the image forming apparatus of at least one embodiment.

FIG. 2 is a diagram illustrating a specific example of a hardware configuration of the image forming apparatus 1. The image forming apparatus 1 includes a central processing unit (CPU) 91, a memory 92, an auxiliary storage device 93, and the like connected by a bus and executes a program. The image forming apparatus 1 functions as an apparatus including the scanner unit 12, the sheet supply unit 13, the printer unit 14, the sheet discharge unit 15, the control panel 16, and a communication unit 90 (e.g., a communications interface, a network interface, etc.) by executing the program.

All or some of the functions of the image forming apparatus 1 may be realized by using hardware such as an application specific integrated circuit (ASIC), a programmable logic device (PLD), and a field programmable gate array (FPGA). The program may be recorded in a computer-readable recording medium. The computer-readable recording medium is a storage device, for example, a portable medium such as a flexible disk, a magneto-optical disk, a ROM, and a CD-ROM, and a hard disk built in a computer system. The program may be transmitted through a telecommunication line.

The CPU 91 functions as the control unit 17 (e.g., a controller) by executing the program stored in the memory 92 and the auxiliary storage device 93. The control unit 17 controls an operation of each functional unit of the image forming apparatus 1. The auxiliary storage device 93 is configured using a storage device such as a magnetic hard disk device or a semiconductor memory device. The auxiliary storage device 93 stores various types of information about the image forming apparatus 1. The communication unit 90 is configured to include a communication interface for connecting its own device to an external device. The communication unit 90 communicates with an external device through the communication interface. The control unit 17 of this embodiment includes a current detection portion 98 and a life information acquisition portion 99. The functions of the current detection portion 98 and the life information acquisition portion 99 will be described later.

Figure 3:
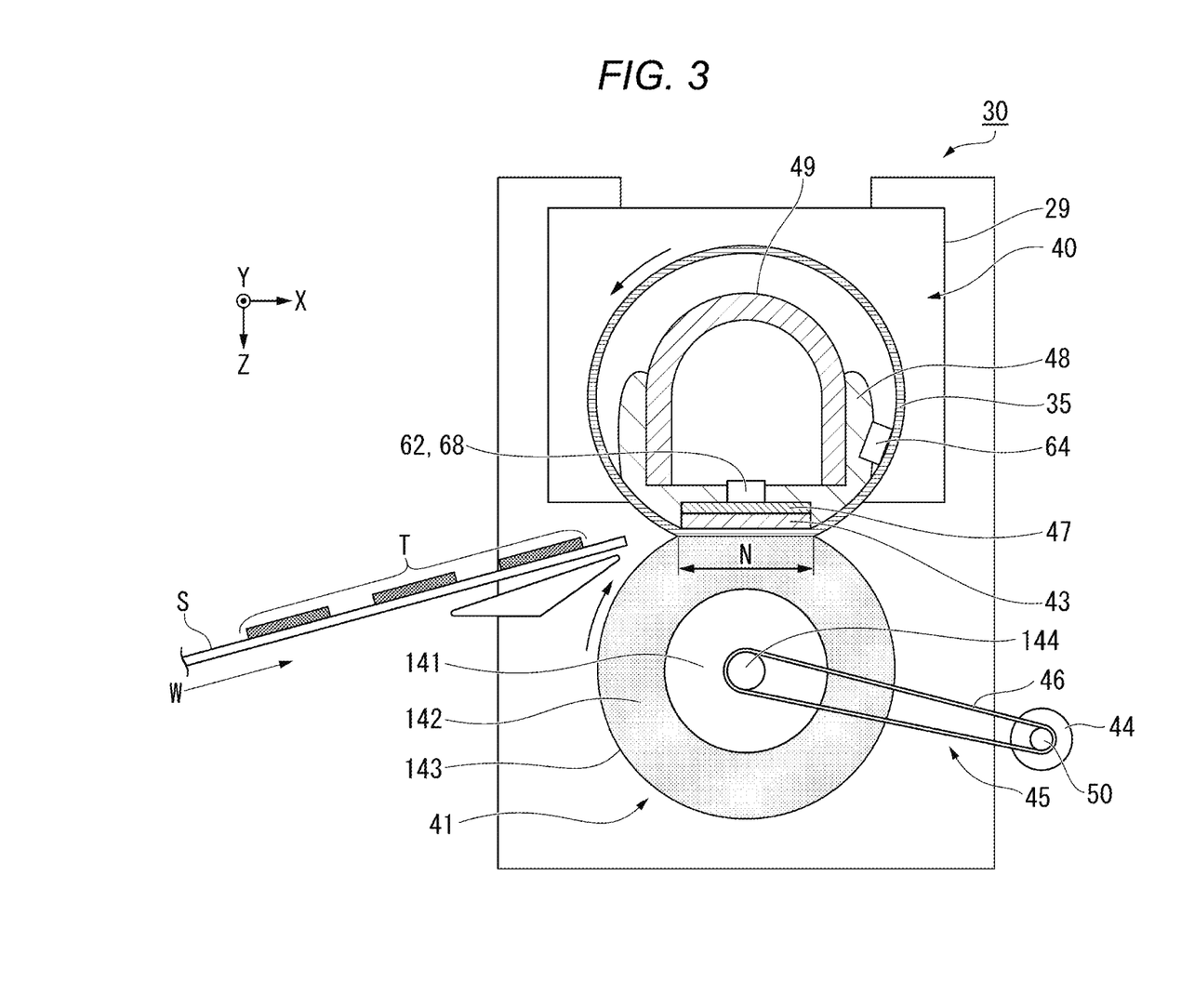
FIG. 3 is a cross-sectional view of a fixing device according to at least one embodiment when viewed in the longitudinal direction.

Hereinafter, a configuration of the fixing device 30 (e.g., an image fixer, a fixer, an image fixing assembly, a fixing assembly, etc.) of at least one embodiment will be described in detail. FIG. 3 is a cross-sectional view of the fixing device 30 when viewed from the longitudinal direction. The fixing device 30 (e.g., an image fixer) includes a fixing belt unit 40 and a pressure roller 41. In this embodiment, the fixing device 30 is controlled by the control unit 17. A dedicated control unit for controlling the fixing device 30 may be provided separately from the control unit 17.

As illustrated in FIG. 3, the fixing belt unit 40 (e.g., a fixing belt assembly, etc.) forms a nip N with the pressure roller 41. The fixing belt unit 40 heats a toner image T of the sheet S that enters the nip N. The fixing belt unit 40 includes a fixing belt 35, a heater unit 43, a first temperature detection portion 62, a thermostat portion 68, a second temperature detection portion 64, a heat conduction member 47, a support member 48, and a stay 49.

Hereinafter, the XYZ coordinate system may be used to describe the configuration of the fixing device 30. In at least one embodiment, the X-direction, Y-direction, and Z-direction are defined as follows. The X-direction corresponds to a direction along the lateral direction of the heater unit 43. The Y-direction corresponds to a direction parallel to the width direction of the fixing belt unit 40 and the pressure roller 41. In this embodiment, the Y-direction corresponds to a main scanning direction that intersects a conveyance direction W of the sheet S. The Z-direction corresponds to a direction along the normal direction of a substrate 51.

The fixing belt 35 has an endless peripheral surface. The fixing belt 35 is formed in a cylindrical shape. The fixing belt 35 includes a base layer, an elastic layer, and a release layer in order from the inner peripheral side. The base layer is formed in a cylindrical shape. The elastic layer is stacked and disposed on the outer peripheral surface of the base layer. The elastic layer is made of an elastic material such as rubber. The release layer is stacked and disposed on the outer peripheral surface of the elastic layer. The release layer is made of a material such as a PFA resin. In this embodiment, the inner diameter of the fixing belt 35 is approximately 30 mm, and a Ni-base material having a thickness of 40 μm is used as the base layer, a silicone rubber layer having a thickness of about 200 μm is used as the elastic layer, and a PFA resin tube having a thickness of 30 μm is used as the release layer. A coating may be applied to the inside of the base layer in order to improve a friction sliding property with a heating member.

The heater unit 43 (e.g., a heater, a thermal energy generator, a resistive heater, etc.) is disposed inside the fixing belt 35. The heater unit 43 heats the fixing belt 35. The fixing belt 35 is heated by the heater unit 43 to fix the toner image T onto the sheet S. In this embodiment, the heater unit 43 corresponds to a "heater portion".

As illustrated in FIG. 3, the heater unit 43 is disposed inside the fixing belt 35. A lubricant (not illustrated) such as oil is applied to the inner peripheral surface of the fixing belt 35. The heater unit 43 contacts the inner peripheral surface of the fixing belt 35 through the lubricant. When the heater unit 43 generates heat, the viscosity of the lubricant decreases. The sliding property between the heater unit 43 and the fixing belt 35 is ensured. The fixing belt 35 is a strip-shaped thin film that slides on the surface of the heater unit 43 while being in contact with the heater unit 43 on one surface thereof.

The heat conduction member 47 (e.g., a heat conductor, a thermal energy conductor, etc.) is made of a metal material having high thermal conductivity such as copper. An outer shape of the heat conduction member 47 is the same as the outer shape of the heater unit 43. The heat conduction member 47 is disposed in contact with the surface on the −Z side of the heater unit 43. The heat conduction member 47 averages temperature distribution of the heater unit 43.

The support member 48 (e.g., a frame) is made of a resin material such as a liquid crystal polymer. The support member 48 is disposed so as to cover the −Z side and both sides of the heater unit 43 in the X-direction. The support member 48 supports the heater unit 43 through the heat conduction member 47. Round chamfers are formed on both end portions of the support member 48 in the X-direction. The support member 48 supports the inner peripheral surface of the fixing belt 35 at both end portions of the heater unit 43 in the X-direction.

The stay 49 (e.g., a stay member, a frame, etc.) is made of a steel plate material or the like. The cross-section formed by a plane along the XZ-plane of the stay 49 is formed in a U-shape. The stay 49 is attached to the −Z side of the support member 48 so that a U-shaped opening is closed by the support member 48. The stay 49 extends in the Y-direction. Both end portions of the stay 49 in the Y-direction are fixed to a housing of the image forming apparatus 1. With this configuration, the fixing belt unit 40 is supported by the image forming apparatus 1. The stay 49 improves a flexural rigidity of the fixing belt unit 40. A flange 29 that restricts the movement of fixing belt 35 in the Y-direction is attached near both end portions of the stay 49 in the Y-direction.

The pressure roller 41 pressurizes the toner image T of the sheet S that enters the nip N. The pressure roller 41 rotates to convey the sheet S. The pressure roller 41 includes a core metal 141, an elastic layer 142, and a release layer 143. The pressure roller 41 can press the surface thereof against the fixing belt 35 and can be rotationally driven.

The core metal 141 is formed in a columnar shape and made of a metal material such as stainless steel, for example. Both end portions of the core metal 141 in the axial direction are rotatably supported by the housing 11. The core metal 141 is rotationally driven as described later. The core metal 141 abuts on a cam member (not illustrated). The cam member rotates to cause the core metal 141 to approach and separate from the fixing belt unit 40.

The elastic layer 142 is made of an elastic material such as silicone rubber. The elastic layer 142 is formed on the outer peripheral surface of the core metal 141 with a constant thickness. The release layer 143 is made of a resin material such as tetrafluoroethylene-perfluoroalkyl vinyl ether copolymer (PFA). The release layer is formed on the outer peripheral surface of the elastic layer 142. The hardness of the outer peripheral surface of the pressure roller 41 is preferably 40° to 70° under a load of 9.8 N using an ASKER-C hardness meter. With this configuration, an area of the nip N and durability of the pressure roller 41 are ensured.

The pressure roller 41 can approach and separate from the fixing belt unit 40 by the rotation of the cam member. When the pressure roller 41 is approached to the fixing belt unit 40 and pressed by a pressure spring, the nip N is formed.

On the other hand, when the sheet S is jammed in the fixing device 30, the sheet S can be removed by separating the pressure roller 41 from the fixing belt unit 40. Plastic deformation of the fixing belt 35 is prevented by separating the pressure roller 41 from the fixing belt unit 40 in a state where the fixing belt 35 stops rotating, such as during sleep.

The pressure roller 41 is rotationally driven by a drive motor 44 (e.g., an actuator, a driver, etc.). The rotational force of the drive motor 44 is transmitted to the pressure roller 41 through a driving force transmission member 45 (e.g., a power transmission assembly, a power transmission, etc.). In this embodiment, the drive motor 44 corresponds to a "drive portion" (a driver).

The driving force transmission member 45 includes a belt 46 stretched between the core metal 141 and the drive motor 44. The belt 46 is stretched between a pulley 144 provided on the core metal 141 and a rotation shaft 50 of the drive motor 44. The drive motor 44 generates predetermined torque according to a current value (i.e., a drive current value) supplied to the drive motor 44. The configuration of the driving force transmission member 45 is not limited to the one described above. As the driving force transmission member 45, for example, a configuration in which a gear train in which a plurality of gears are combined is used to transmit a rotational force of the drive motor 44 to the pressure roller 41 may be adopted.

When the pressure roller 41 rotates in a state where the nip N is formed, the fixing belt 35 of the fixing belt unit 40 is driven to rotate. The pressure roller 41 conveys the sheet S in the conveyance direction W by rotating in a state where the sheet S is placed in the nip N.

In the fixing device 30, for example, when deterioration occurs over time, the load torque of the drive motor 44 that drives the pressure roller 41 changes as a pressurizing force (i.e., a nip pressure) of the pressure roller 41 against the fixing belt unit 40 changes. When the nip pressure becomes large, it is necessary to increase the drive current in order to obtain the load torque of the drive motor 44. When the nip pressure becomes low, it is necessary to reduce the drive current in order to obtain the load torque of the drive motor 44. In the image forming apparatus 1 of this embodiment, the control unit 17 controls the load torque of the drive motor 44 by detecting the drive current of the drive motor 44 by the current detection portion 98 (e.g., a drive current sensor).

Figure 4:
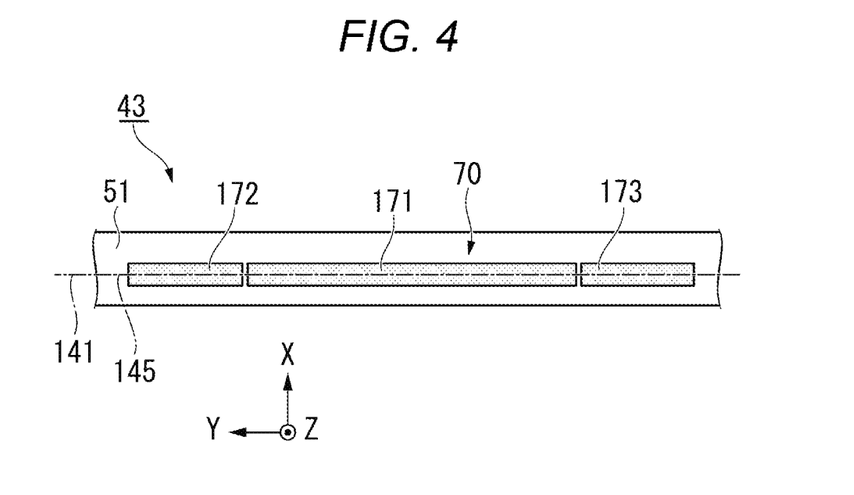
FIG. 4 is a bottom view of a heater unit of at least one embodiment.

FIG. 4 is a bottom view of the heater unit 43. As illustrated in FIG. 4, the heater unit 43 includes the substrate 51 and a heat generation member 70. The substrate 51 is made of a metal material such as stainless steel or a ceramic material such as aluminum nitride. The substrate 51 is formed in a long and thin rectangular plate shape along the Y-axis. The substrate 51 is disposed inside the fixing belt 35 in the radial direction. The substrate 51 has the axial direction of the fixing belt 35 as the longitudinal direction thereof (e.g., extends longitudinally along the axis of rotation of the fixing belt 35).

The heat generation member 70 is provided on the surface on one side (+Z side) of the substrate 51 through an insulating layer such as a glass material. The heat generation member 70 is made of a temperature coefficient of resistance (TCR) material. For example, the heat generation member 70 is made of silver palladium alloy or the like. The outer shape of the heat generation member 70 is a rectangular shape having a long side along the Y-direction and a short side along the X-direction.

The heat generation member 70 includes a central heating element 171, a first end heating element 172, and a second end heating element 173 as a plurality of heating elements. The central heating element 171, the first end heating element 172, and the second end heating element 173 are aligned along the Y-direction. The heater unit 43 is provided with a protective layer made of a glass material or the like so as to cover the heat generation member 70. The protective layer improves a sliding property between the heater unit 43 and the fixing belt 35.

A resistance value of the central heating element 171 is smaller than the resistance values of the first end heating element 172 and the second end heating element 173. The resistance values of the first end heating element 172 and the second end heating element 173 are substantially the same. A ratio of the resistance value of the central heating element 171 to the resistance values of the first end heating element 172 and the second end heating element 173 is preferably set in a range of 3:1 to 7:1, more preferably in the range of 4:1 to 6:1.

In this embodiment, the heat generation member 70 heats a heating element group selected according to a printing request. The heating element group is selected from the central heating element 171, the first end heating element 172, and the second end heating element 173 according to the printing request.

The central heating element 171 is disposed at the central portion of the heat generation member 70 in the Y-direction. The central heating element 171 may be configured by combining a plurality of small heating elements disposed side by side in the Y-direction. The first end heating element 172 is disposed on the +Y side of the central heating element 171 and at the end portion on the +Y side of the heat generation member 70. The second end heating element 173 is disposed on the −Y side of the central heating element 171 and at the end portion on the −Y side of the heat generation member 70. The boundary line between the central heating element 171 and the first end heating element 172 may be disposed parallel to the X-direction or may be disposed so as to intersect the X-direction. The same applies to the boundary line between the central heating element 171 and the second end heating element 173. The first end heating element 172 and the second end heating element 173 may be configured by combining a plurality of small heating elements disposed side by side in the Y-direction.

The heat generation member 70 generates heat through energization. The central heating element 171, the first end heating element 172, and the second end heating element 173 can be controlled by the control unit 17 to generate heat independently of each other.

Figure 5:
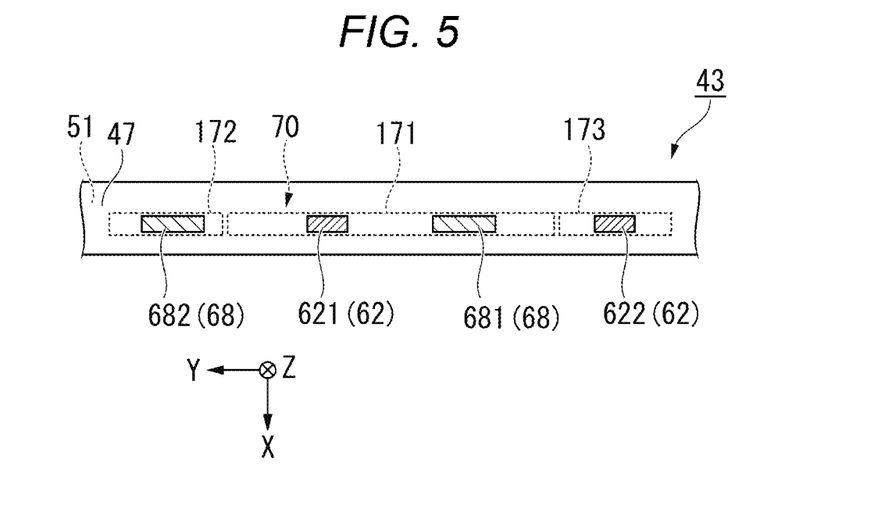
FIG. 5 is a plan view of a first temperature detection member and a thermostat portion of at least one embodiment.

FIG. 5 is a plan view of the first temperature detection portion 62 and the thermostat portion 68 (i.e., a view when viewed from the −Z side). In FIG. 5, the description of the support member 48 is omitted. The following description regarding the arrangement of the first temperature detection portion 62 and the thermostat portion 68 is for describing the arrangement of temperature sensitive elements of each of the first temperature detection portion 62 and the thermostat portion 68.

As illustrated in FIG. 5, the first temperature detection portion 62 (e.g., a first temperature sensor, a heater temperature sensor, etc.) is disposed on the −Z side of the heater unit 43 with the heat conduction member 47 interposed therebetween. For example, the first temperature detection portion 62 is a thermistor. The first temperature detection portion 62 is mounted and supported on the −Z side surface of the support member 48. The temperature sensitive element of the first temperature detection portion 62 contacts the heat conduction member 47 through a hole penetrating the support member 48 in the Z-direction. The first temperature detection portion 62 measures the temperature of the heater unit 43 through the heat conduction member 47. In this embodiment, the first temperature detection portion 62 corresponds to the "heater temperature detection portion".

The first temperature detection portion 62 includes a central heater thermometer 621 and an end heater thermometer 622, which are disposed side by side in the Y-direction. The central heater thermometer 621 and the end heater thermometer 622 are disposed within the range of the heat generation member 70 in the Y-direction. The central heater thermometer 621 and the end heater thermometer 622 are disposed at the center of the heat generation member 70 in the X-direction. When viewed from the Z-direction, the central heater thermometer 621, the end heater thermometer 622, and the heat generation member 70 at least partially overlap each other.

In the first temperature detection portion 62, the central heater thermometer 621 measures the temperature of the central heating element 171. The central heater thermometer 621 is disposed within the range of the central heating element 171. When viewed from the Z-direction, the central heater thermometer 621 overlaps the central heating element 171.

In the first temperature detection portion 62, the end heater thermometer 622 measures the temperature of the second end heating element 173. The heat generation of the first end heating element 172 and the second end heating element 173 is similarly controlled by the control unit 17 and thus the temperature of the first end heating element 172 and the temperature of the second end heating element 173 are equal. The end heater thermometer 622 is disposed within the range of the second end heating element 173. When viewed from the Z-direction, the end heater thermometer 622 overlaps the second end heating element 173. The end heater thermometer 622 measuring the temperature of the first end heating element 172 may be separately provided.

The thermostat portion 68 (e.g., a thermostat, a temperature controller, etc.) shuts off energization to the heat generation member 70 when the temperature of the heater unit 43 detected through the heat conduction member 47 exceeds a predetermined temperature. The thermostat portion 68 includes a central thermostat 681 and an end thermostat 682. The thermostat portion 68 is also disposed similarly to the first temperature detection portion 62 described above.

The central thermostat 681 shuts off energization to the heat generation member 70 when the temperature of the central heating element 171 exceeds a predetermined temperature in the detection result from the central heater thermometer 621. The central thermostat 681 is disposed within the range of the central heating element 171. When viewed from the Z-direction, the central thermostat 681 overlaps the central heating element 171.

The end thermostat 682 shuts off energization to the heat generation member 70 when the temperature of the first end heating element 172 exceeds a predetermined temperature in the detection result from the end heater thermometer 622. The heat generation of the first end heating element 172 and the second end heating element 173 is similarly controlled and thus the temperature of the first end heating element 172 and the temperature of the second end heating element 173 are equal. The end thermostat 682 is disposed within the range of the first end heating element 172. When viewed from the Z-direction, the end thermostat 682 overlaps the first end heating element 172.

In the heater unit 43 of this embodiment, the temperature of the central heating element 171 is controlled by disposing the central heater thermometer 621 and the central thermostat 681 within the range of the central heating element 171. In the heater unit 43 of this embodiment, the temperature of the first end heating element 172 and the second end heating element 173 is controlled by disposing the end heater thermometer 622 and the end thermostat 682 within the range of the first end heating element 172 and the second end heating element 173.

The second temperature detection portion 64 (e.g., a belt temperature sensor) is disposed on the +X side inside the fixing belt 35, as illustrated in FIG. 3. The second temperature detection portion 64 contacts the inner peripheral surface of the fixing belt 35 and detects the temperature of the fixing belt 35. In this embodiment, the second temperature detection portion 64 corresponds to the "belt temperature detection portion".

Figure 6:
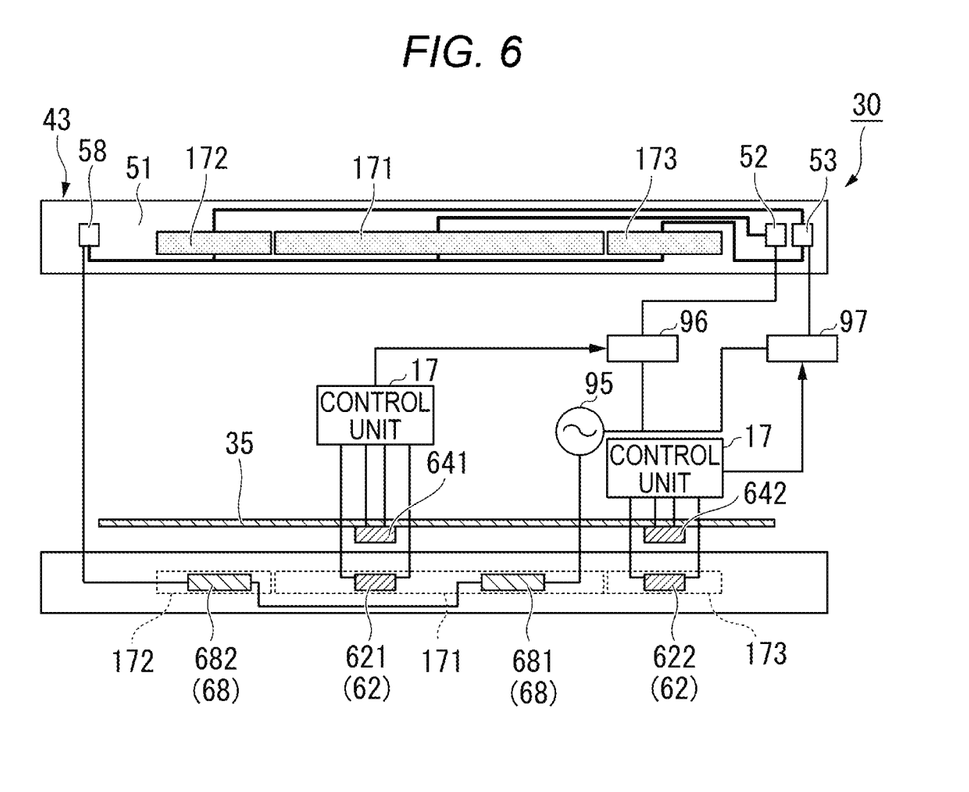
FIG. 6 is an electric circuit diagram of the fixing device of at least one embodiment.

FIG. 6 is an electric circuit diagram of the fixing device 30. In FIG. 6, the bottom view of FIG. 4 is illustrated in the upper part, and the plan view of FIG. 5 is illustrated in the lower part. In FIG. 6, the second temperature detection portion 64 is illustrated above the plan view in the lower part, together with the cross-section of the fixing belt 35. The second temperature detection portion 64 includes a central belt thermometer 641 and an end belt thermometer 642.

The central belt thermometer 641 contacts the central portion of the fixing belt 35 in the Y-direction. The central belt thermometer 641 contacts the fixing belt 35 within the range of the central heating element 171 in the Y-direction. The central belt thermometer 641 measures the temperature of the central portion of the fixing belt 35 in the Y-direction.

The end belt thermometer 642 contacts the end portion on the −Y side of the fixing belt 35. The end belt thermometer 642 contacts the fixing belt 35 within the range of the second end heating element 173 in the Y-direction. The end belt thermometer 642 measures the temperature of the end portion on the −Y side of the fixing belt 35. As described above, the first end heating element 172 and the second end heating element 173 are similarly controlled to generate heat. In this embodiment, the temperature of the end on the −Y side of the fixing belt 35 and the temperature of the end on the +Y side end thereof are equal.

A power supply 95 is connected to a central contact 52 through a central triac 96. The power supply 95 is connected to an end contact 53 through an end triac 97. The control unit 17 controls ON or OFF of the central triac 96 and the end triac 97 independently of each other.

When the control unit 17 turns ON the central triac 96, the central heating element 171 is energized from the power supply 95, and the central heating element 171 generates heat. When the control unit 17 turns ON the end triac 97, the first end heating element 172 and the second end heating element 173 are energized from the power supply 95, and the first end heating element 172 and the second end heating element 173 generate heat. Therefore, the central heating element 171, the first end heating element 172, and the second end heating element 173 are controlled to generate heat independently of each other. The central heating element 171, the first end heating element 172, and the second end heating element 173 are connected in parallel to the power supply 95.

The power supply 95 is connected to a common contact 58 through the central thermostat 681 and the end thermostat 682. The central thermostat 681 and the end thermostat 682 are connected in series. When the temperature of the central heating element 171 rises abnormally, the temperature detected by the central thermostat 681 exceeds a predetermined temperature. The central thermostat 681 shuts off energization to the entire heat generation member 70 from the power supply 95.

When the temperature of the first end heating element 172 rises abnormally, the temperature detected by the end thermostat 682 exceeds the predetermined temperature. At this time, the end thermostat 682 shuts off energization to the entire heat generation member 70 from the power supply 95. As described above, the first end heating element 172 and the second end heating element 173 are similarly controlled to generate heat. For that reason, when the temperature of the second end heating element 173 rises abnormally, the temperature of the first end heating element 172 also rises similarly. Similarly, when the temperature of the second end heating element 173 rises abnormally, the end thermostat 682 shuts off energization to the entire heat generation member 70 from the power source 95.

The control unit 17 measures the temperature of the central heating element 171 by the central heater thermometer 621. The control unit 17 measures the temperature of the second end heating element 173 by the end heater thermometer 622. The temperature of the second end heating element 173 is equal to the temperature of the first end heating element 172. The control unit 17 measures the temperature of the heat generation member 70 by the first temperature detection portion 62 when the fixing device 30 is started (e.g., during warming up) and when returning from a temporary pause state (e.g., a sleep state).

When the fixing device 30 is started and when returning from the temporary pause state, the control unit 17 causes the heating member 70 to generate heat for a short time when the temperature of at least one of the central heating element 171 and the second end heating element 173 is lower than a predetermined temperature. After that, the control unit 17 starts the rotation of the pressure roller 41. The heat generated by the heat generation member 70 reduces the viscosity of the lubricant applied to the inner peripheral surface of the fixing belt 35. Thereby, the sliding property between the fixing belt unit 40 and the fixing belt 35 at the start of rotation of the pressure roller 41 is ensured.

The control unit 17 measures the temperature of the central portion of the fixing belt 35 in the Y-direction by the central portion belt thermometer 641. The control unit 17 measures the temperature of the end portion on the −Y side of the fixing belt 35 by the end belt thermometer 642. The temperature of the end portion on the −Y side of the fixing belt 35 is equal to the temperature of the end portion on the +Y side of the fixing belt 35. The control unit 17 measures the temperatures of the central portion and the end portion of the fixing belt 35 in the Y-direction when the fixing device 30 is operating.

As described above, the control unit 17 performs phase control or wave number control of the electric power supplied to the heat generation member 70 by the central triac 96 and the end triac 97. The control unit 17 controls energization to the central heating element 171 based on the temperature measurement result of the central portion of the fixing belt 35 in the Y-direction. The control unit 17 controls energization to the first end heating element 172 and second end heating element 173 based on the temperature measurement result of the end portion of the fixing belt 35 in the Y-direction.

In the image forming apparatus 1 of this embodiment, the control unit 17 can measure the load torque of the pressure roller 41 by detecting the drive current of the drive motor 44 by the current detection portion 98 (e.g., a current sensor, a drive current sensor, etc.). The control unit 17 can acquire life information of the fixing belt unit 40 of the fixing device 30 by the life information acquisition portion 99.

In this embodiment, the life information acquisition portion 99 (e.g., a life information sensor, a service life sensor, etc.) acquires the life information from the total drive time of the fixing belt unit 40. The total drive time of the fixing belt unit 40 corresponds to a cumulative drive time of the fixing device 30 driven along with the printing operation of the image forming apparatus 1. For that reason, for example, when the fixing belt unit 40 is replaced with a new part, the total drive time of the fixing belt unit 40 is reset. A method of acquiring the life information of the fixing belt unit 40 by the life information acquisition portion 99 is not limited to the total drive time, and for example, the life information of the fixing belt unit 40 may be acquired based on the total number of prints of the image forming apparatus 1 or the total number of rotations of the fixing belt unit 40 (e.g., of the drive motor 44).

In this embodiment, the current detection portion 98 and the life information acquisition portion 99 are components of the control unit 17, but the current detection portion 98 and the life information acquisition portion 99 may be components of a control unit dedicated to the fixing device.

The image forming apparatus 1 of this embodiment executes a failure prediction processing mode of predicting a failure of the fixing device 30. The image forming apparatus 1 selects a first failure prediction processing mode or a second failure prediction processing mode, which will be described later, based on the detection result of the current detection portion 98. The image forming apparatus 1 selects and executes a driving method based on the acquisition results of the first temperature detection portion 62, the second temperature detection portion 64 and the life information acquisition portion 99 in each of the first failure prediction processing mode and the second failure prediction processing mode.

Hereinafter, the failure prediction processing mode executed by the image forming apparatus 1 of at least one embodiment will be described. The image forming apparatus 1 starts a printing operation in response to a printing operation start instruction from the control panel 16 or an externally connected device.

Figure 7:
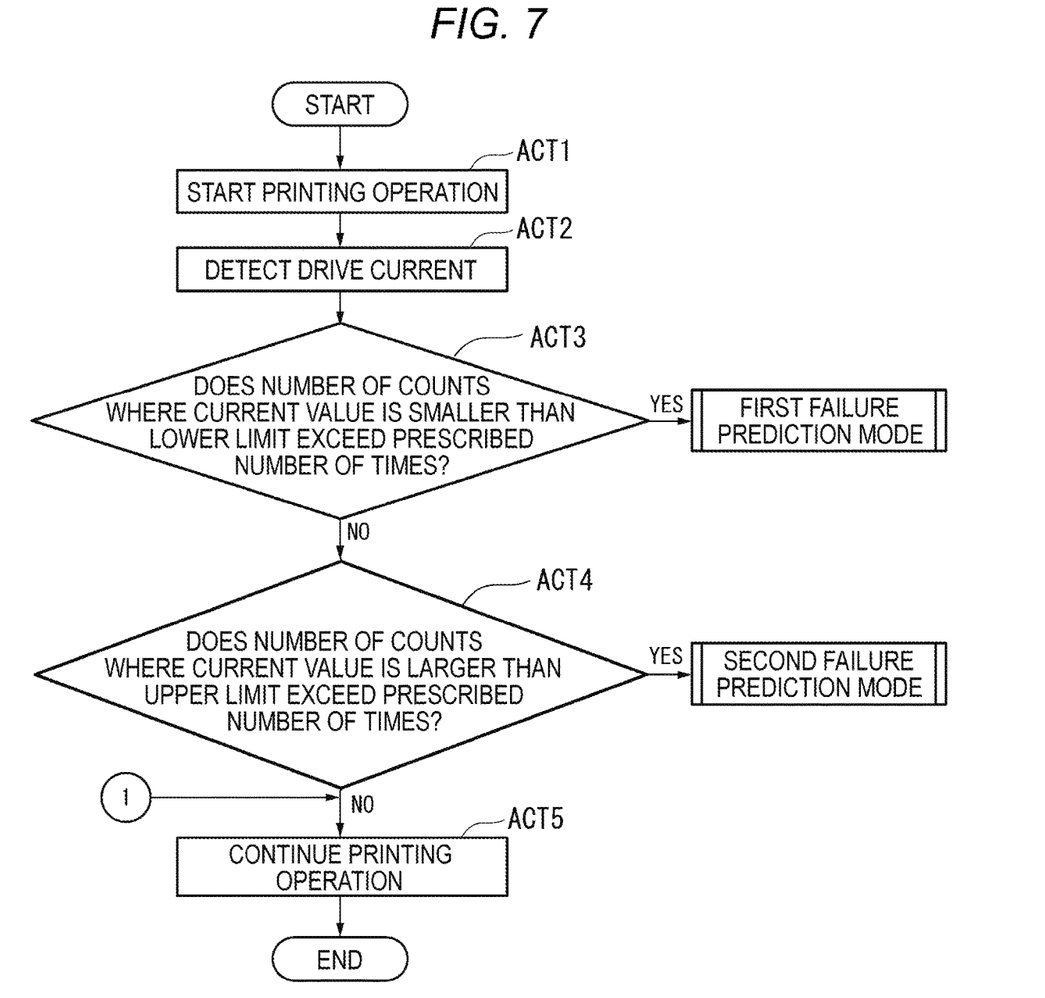
FIG. 7 is a flowchart illustrating a failure prediction operation of the image forming apparatus of at least one embodiment.

FIGS. 7 to 10 are flowcharts illustrating an example of a failure prediction operation of the image forming apparatus 1 of at least one embodiment. As illustrated in FIG. 7, the control unit 17 starts the fixing device 30 with the start of the printing operation (ACT 1). The control unit 17 starts the rotation of the pressure roller 41 after making the pressure roller 41 abut on the fixing belt unit 40 in a state of being pressurized and supplies power to the heat generation member 70 of the heater unit 43 to cause the heat generating element to generate heat in accordance with the printing instruction.

The control unit 17 detects (e.g., measures) a drive current of the drive motor 44 for each print job based on a detection result of the current detection portion 98 (ACT 2). The control unit 17 determines whether or not the detected drive current is smaller than a preset lower limit value.

The control unit 17 counts the number of times that the drive current value falls below the lower limit value (e.g., throughout the entire print job, throughout multiple print jobs, within a predetermined period of time, etc.), and determines whether or not the number of counts exceeds a prescribed number of times (e.g., a predetermined threshold number of times) prescribed in advance (ACT 3).

When it is determined that the number of counts exceeds the prescribed number of times (YES in ACT 3), the control unit 17 selects the first failure prediction processing mode. The control unit 17 eliminates the influence of variations due to drive of the drive motor 44 by setting whether or not the number of counts exceeds the prescribed number of times as a determination condition and selects the first failure prediction processing mode when it is determined that the drive current value is clearly reduced.

Figure 8:
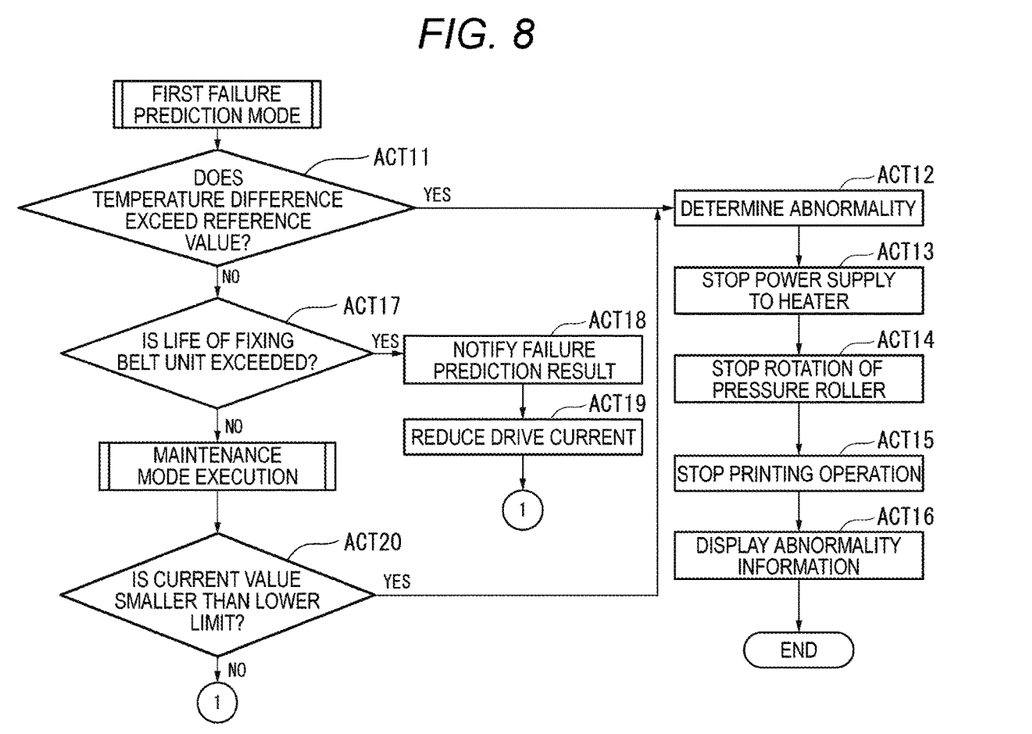
FIG. 8 is another flowchart illustrating the failure prediction operation of the image forming apparatus of at least one embodiment.

FIG. 8 is a flowchart regarding the first failure prediction processing mode. As illustrated in FIG. 8, in the first failure prediction processing mode, the control unit 17 acquires the temperature of the heater unit 43 from the first temperature detection portion 62 and acquires the temperature of the fixing belt 35 from the second temperature detection portion 64. The control unit 17 executes a detection operation of the first temperature detection portion 62 and the second temperature detection portion 64 for each print job.

The control unit 17 acquires a difference between a detection value of the first temperature detection portion 62 and a detection value of the second temperature detection portion 64. The control unit 17 acquires a temperature difference between the heater unit 43 and the fixing belt 35. The control unit 17 determines whether or not the temperature difference exceeds a preset reference value (ACT 11).

When it is determined that the temperature difference exceeds the preset reference value (YES in ACT 11), the control unit 17 determines that an abnormality occurs in the fixing device 30 (e.g., the fixing device 30 is in an abnormal state) (ACT 12). As the abnormality of the fixing device 30, the control unit 17 predicts, for example, damage of the driving force transmission member 45 or an abnormality in abutment of the fixing belt 35 and the pressure roller 41, and records the predicted abnormality in the CPU 91 as abnormality information.

When it is determined that the abnormality occurs in the fixing device 30, the control unit 17 stops the supply of power to the heater unit 43 (i.e., deactivate the heater) and also stops the rotation of the pressure roller 41 by stopping the supply of power to the drive motor 44 (ACT 13 and ACT 14). In addition, the control unit 17 stops the operation of the printer unit 14 and displays the abnormality information recorded in the CPU 91 on the display 162 of the control panel 16 (ACT 15 and ACT 16). Thus, the control unit 17 ends the first failure prediction processing mode.

On the other hand, when it is determined that the temperature difference does not exceed the preset reference value (NO in ACT 11), the control unit 17 determines whether or not the life of the fixing belt unit 40 is exceeded based on the acquisition result of the life information acquisition portion 99 (ACT 17). The control unit 17 acquires the total drive time of the fixing belt unit 40 from the life information acquisition portion 99 and determines whether or not the life of fixing belt unit 40 is exceeded. The control unit 17 executes an acquisition operation of the life information acquisition portion 99 for each print job.

When it is determined that the life of fixing belt unit 40 is exceeded (YES in ACT 17), the control unit 17 determines that the state of the fixing device 30 is as follows. At this case, since the drive current of the drive motor 44 is smaller than the lower limit value, the control unit 17 determines that the load torque of the drive motor 44 is small and the width of the nip formed between the fixing belt unit 40 and the pressure roller 41 is small. The control unit 17 determines that the cause is that the fixing belt unit 40 is deteriorated and the life thereof is exceeded.

The control unit 17 notifies information about a failure prediction of the fixing device 30 (ACT 18). The control unit 17 causes the display 162 of the control panel 16 to display a message prompting replacement of the fixing belt unit 40.

Although the life of the fixing belt unit 40 is exceeded, there is no problem in the temperature difference between the heater unit 43 and the fixing belt 35, and thus the control unit 17 determines that fixing can be continued. The control unit 17 executes control for performing a printing process in a state where printing speed is reduced on the assumption that the nip width is small as described above. The control unit 17 controls the drive current of the drive motor 44 to be reduced (ACT 19), returns to step ACT 5 illustrated in FIG. 7 and continues the printing operation.

On the other hand, when it is determined that the life of the fixing belt unit 40 is not exceeded (NO in ACT 17), the control unit 17 selects and executes the maintenance mode of performing maintenance on the fixing device 30.

Since the life of the fixing belt unit 40 is not exceeded, the control unit 17 determines that a drive load of the drive motor 44 is lightened for some reason and executes the maintenance mode. By executing the maintenance mode, the control unit 17 self-checks whether or not the drive motor 44 returns to a normal state.

Figure 9:
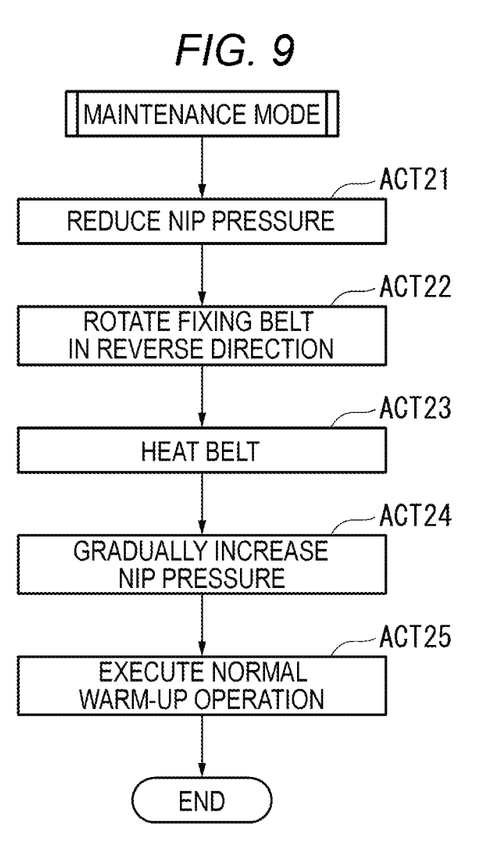
FIG. 9 is another flowchart illustrating the failure prediction operation of the image forming apparatus of at least one embodiment.

FIG. 9 is a flowchart regarding the maintenance mode. As illustrated in FIG. 9, the control unit 17 reduces pressurization (i.e., nip pressure) of the pressure roller 41 against the fixing belt 35 (ACT 21) and reversely rotates the fixing belt 35 to reverse the rotation direction of the drive motor 44 (ACT 22). The control unit 17 drives the heater unit 43 to heat the fixing belt 35 that rotates in the reverse direction for a certain period (ACT 23). The control unit 17 gradually increases the load (i.e., nip pressure) applied by the pressure roller 41 to the fixing belt 35 in the state of being heated (ACT 24). Finally, the control unit 17 executes a normal warm-up operation for the fixing device 30 (ACT 25).

As described above, the control unit 17 executes, as the maintenance mode, the driving method including an act of rotating the fixing belt 35 in the reverse direction, an act of heating the fixing belt 35 that rotates in the reverse direction by the heater unit 43, an act of gradually increasing the load applied by the pressure roller 41 to the heated fixing belt 35, and an act of executing the normal warm-up operation for the fixing device 30.

After performing the maintenance mode, the control unit 17 proceeds to ACT 20 illustrated in FIG. 8. The control unit 17 re-determines whether or not the drive current value is smaller than the lower limit value, based on the detection result of the current detection portion 98 (ACT 20).

When it is determined that the drive current value is smaller than the lower limit value after execution of the maintenance mode (YES in ACT 20), the control unit 17 determines that the abnormality of the fixing device 30 is not alleviated and the fixing device 30 is abnormal (ACT 12). When it is determined that the fixing device 30 is abnormal, the control unit 17 executes ACT 13 to ACT 16 described above.

On the other hand, when it is determined that the drive current value is larger than the lower limit value (NO in ACT 20) after the execution of the maintenance mode, the control unit 17 determines that the abnormality of the fixing device 30 is alleviated. This is because, through the maintenance mode, the abutment state between the fixing belt 35 and the pressure roller 41 is improved and the nip width is optimized and thus, the load torque of the drive motor 44 is increased to make the drive current value larger than the lower limit value. After the abnormality of the fixing device 30 is alleviated, the control unit 17 returns to step ACT 5 illustrated in FIG. 7, and continues the printing operation.

Returning to FIG. 7, when it is determined that the number of counts where the drive current value is smaller than the lower limit value does not exceed the prescribed number of times (NO in ACT 3), the control unit 17 determines whether or not the detected drive current is larger than a preset upper limit value. The control unit 17 counts the number of times that the drive current value exceeds the upper limit value and determines whether or not the number of counts exceeds the prescribed number of times (e.g., a predetermined threshold number of times) prescribed in advance (ACT 4).

When it is determined that the number of counts exceeds the prescribed number of times (YES in ACT 4), the control unit 17 selects the second failure prediction processing mode. The control unit 17 eliminates the influence of variations due to the drive of the drive motor 44 by setting whether or not the number of counts exceeds the prescribed number of times as a determination condition and selects the second failure prediction processing mode when it is determined that the drive current value is clearly increased.

Figure 10:
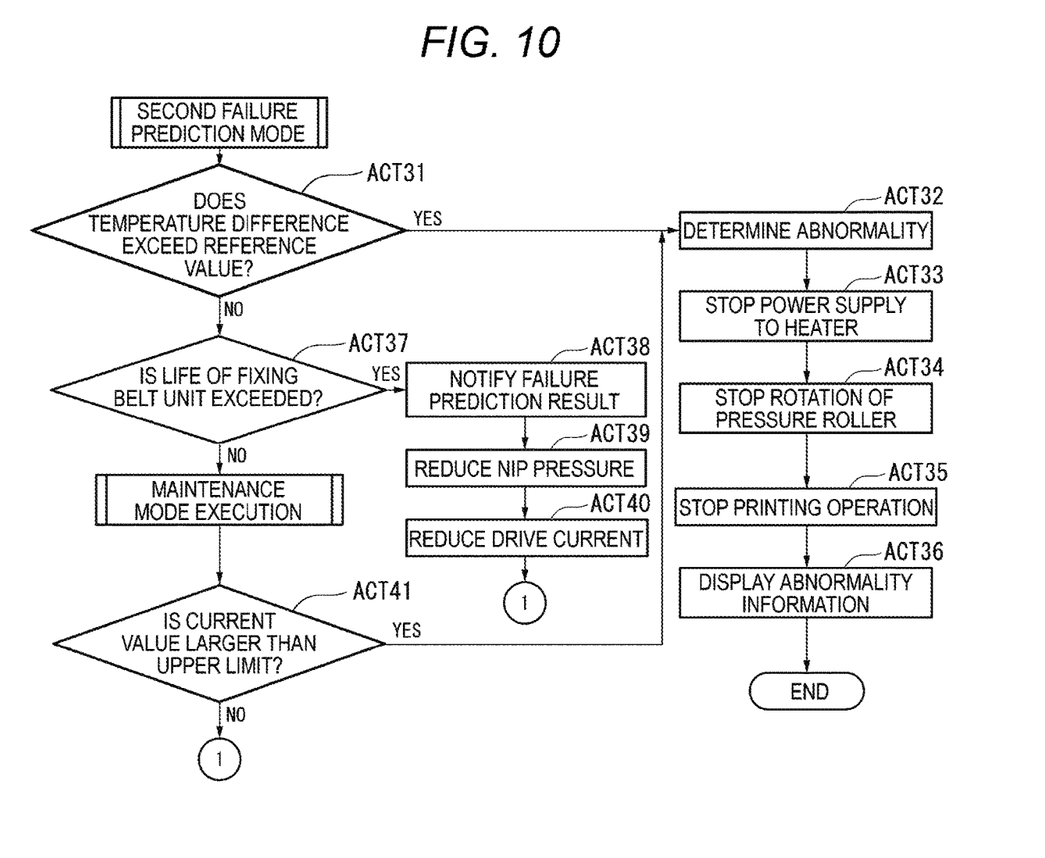
FIG. 10 is another flowchart illustrating the failure prediction operation of the image forming apparatus of at least one embodiment.

FIG. 10 is a flowchart regarding the second failure prediction processing mode. As illustrated in FIG. 10, in the second failure prediction processing mode, the control unit 17 acquires the temperature of the heater unit 43 from the first temperature detection portion 62 and acquires the temperature of the fixing belt 35 from the second temperature detection portion 64. The control unit 17 executes the detection operation of the first temperature detection portion 62 and the second temperature detection portion 64 for each print job.

The control unit 17 acquires the difference between the detection value of the first temperature detection portion 62 and the detection value of the second temperature detection portion 64. The control unit 17 acquires the temperature difference between the heater unit 43 and the fixing belt 35. The control unit 17 determines whether or not the temperature difference exceeds a preset reference value (ACT 31).

When it is determined that the temperature difference exceeds the preset reference value (YES in ACT 31), the control unit 17 determines that an abnormality occurs in the fixing device 30 (ACT 32). As the abnormality of the fixing device 30, the control unit 17 predicts, for example, damage of the driving force transmission member 45 or an abnormality in abutment of the fixing belt 35 and the pressure roller 41 and records the predicted abnormality in the CPU 91 as abnormality information.

When it is determined that the abnormality occurs in the fixing device 30, the control unit 17 stops the supply of power to the heater unit 43 and also stops the rotation of the pressure roller 41 by stopping the supply of power to the drive motor 44 (ACT 33 and ACT 34). In addition, the control unit 17 stops the operation of the printer unit 14 and causes the display 162 of the control panel 16 to display the abnormality information recorded in the CPU 91 (ACT 35 and ACT 36). Thus, the control unit 17 ends the second failure prediction processing mode.

On the other hand, when it is determined that the temperature difference does not exceed the preset reference value (NO in ACT 31), the control unit 17 determines whether or not the life of the fixing belt unit 40 is exceeded based on the acquisition result of the life information acquisition portion 99 (ACT 37). The control unit 17 acquires the total drive time of the fixing belt unit 40 from the life information acquisition portion 99 and determines whether or not the life of fixing belt unit 40 is exceeded. The control unit 17 executes the acquisition operation of the life information acquisition portion 99 for each print job.

When it is determined that the life of fixing belt unit 40 is exceeded (YES in ACT 37), the control unit 17 determines that the state of the fixing device 30 is as follows. Since the drive current of the drive motor 44 is larger than the upper limit value, the control unit 17 determines that the drive load of the drive motor 44 exceeds the upper limit. For example, the control unit 17 determines that the fixing belt unit 40 of the fixing device 30 is deteriorated and thus the life thereof is exceeded.

The control unit 17 makes a notification by displaying a message prompting replacement of the fixing belt unit 40, for example, as information about the failure prediction of the fixing device 30, on the display 162 of the control panel 16 (ACT 38).

Although the life of the fixing belt unit 40 is exceeded, there is no problem in the temperature difference between the heater unit 43 and the fixing belt 35, and thus the control unit 17 determines that fixing process can be continued.

The control unit 17 reduces the pressurization (i.e., nip pressure) of the pressure roller 41 against the fixing belt 35 in order to reduce the drive load of the drive motor 44 (ACT 39). The control unit 17 determines that the nip width is reduced by reducing the nip pressure. The control unit 17 performs the printing process in the state where the printing speed is reduced on the assumption that the nip width is small. The control unit 17 controls the drive current of the drive motor 44 to be reduced (ACT 40), returns to step ACT 5 illustrated in FIG. 7, and continues the printing operation.

On the other hand, when it is determined that the life of the fixing belt unit 40 is not exceeded (NO in ACT 37), the control unit 17 selects the maintenance mode of performing maintenance on the fixing device 30. Since the life of the fixing belt unit 40 is not exceeded, the control unit 17 determines that the drive load of the drive motor 44 is heavy for some reason and executes the maintenance mode. By executing the maintenance mode, the control unit 17 self-checks whether or not the drive motor 44 returns to the normal load state.

After performing the maintenance mode described above, the control unit 17 proceeds to ACT 41. The control unit 17 re-determines whether or not the drive current value is larger than the upper limit value, based on the detection result of the current detection portion 98 (ACT 41).

When it is determined that the drive current value is larger than the upper limit value (YES in ACT 41) after the execution of the maintenance mode, the control unit 17 determines that the abnormality of the fixing device 30 is not alleviated and the fixing device 30 is abnormal (ACT 32). When it is determined that the fixing device 30 is abnormal, the control unit 17 executes ACT 33 to ACT 36 described above.

On the other hand, when it is determined that the drive current value is smaller than the upper limit value (NO in ACT 41) after the execution of the maintenance mode, the control unit 17 determines that the abnormality of the fixing device 30 is alleviated. This is because, through the maintenance mode, the lubricant applied to the inner side of the fixing belt 35 is evenly spread over the entire belt, and thus the load torque of the drive motor 44 is decreased to make the drive current value smaller than the upper limit value. After the abnormality of the fixing device 30 is alleviated, the control unit 17 returns to ACT 5 illustrated in FIG. 9, and continues the printing operation.

After the first failure prediction processing mode and the second failure prediction processing mode are selected according to the load torque of the drive motor 44, the image forming apparatus 1 of this embodiment can select the optimal driving method based on the temperature of the heater unit 43, the temperature of the fixing belt 35, and the life information of the fixing belt unit 40. As a result, the state of the fixing device 30 can be correctly determined and a failure of the fixing device 30 can be accurately predicted.

In the image forming apparatus 1 of this embodiment, the fixing device 30 can be restored to the normal state by executing the maintenance operation in the first failure prediction processing mode and the second failure prediction processing mode. The image forming apparatus 1 of this embodiment can provide a high value-added image forming apparatus having a self-repairing function that restores the fixing device 30 having a minor malfunction by the maintenance operation.

Even if the life of the fixing belt unit 40 is exceeded, the image forming apparatus 1 of this embodiment can continue the printing process by reducing the printing speed when it is determined, from the temperature difference between the heater unit 43 and the fixing belt 35, that fixing process can be continued. The image forming apparatus 1 of this embodiment does not stop the printing process more than necessary, and thus downtime of the apparatus can be reduced.

In the image forming apparatus 1 of this embodiment, the control unit 17 executes the first failure prediction processing mode based on the number of times that the drive current value falls below the lower limit value and executes the second failure prediction processing mode based on the number of times that the drive current value exceeds the upper limit value, but is not limited thereto. For example, the control unit 17 may select the first failure prediction processing mode or the second failure prediction processing mode based on a rate of change in the detection value of the current detection portion 98 for each print job. Even when the rate of change for each print job is used as criteria, the failure of the fixing device 30 can be accurately predicted.

Hereinafter, a driving method of the image forming apparatus 1 of this embodiment will be described. The driving method of the image forming apparatus 1 of this embodiment includes detecting the temperature of the heater unit 43 of the fixing belt unit 40 including the fixing belt 35 and the heater unit 43 that heats the fixing belt 35, detecting the temperature of the fixing belt 35, detecting the drive current of the drive motor 44 that drives the pressure roller 41 that pressurizes the fixing belt 35, acquiring life information of the fixing belt unit 40, and selecting a first failure prediction processing mode or a second failure prediction processing mode of predicting a failure of the fixing device 30 based on a drive current of the drive motor 44 and selecting and executing a driving method based on temperature information of the heater unit 43, and temperature information and life information of the fixing belt 35 in each of the first failure prediction processing mode and the second failure prediction processing mode.

According to the driving method of the image forming apparatus 1, it is possible to correctly determine the state of the fixing device 30 and accurately predict the failure of the fixing device 30.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
    a fixing device including:
        a fixing belt assembly including a heater, a fixing belt heated by the heater, a heater temperature sensor configured to detect a temperature of the heater, and a belt temperature sensor configured to detect a temperature of the fixing belt; and
        a pressure roller that presses against the fixing belt to form a nip;
    a drive current sensor configured to detect a drive current of a driver that drives the pressure roller;
    a life information acquisition portion configured to acquire life information of the fixing belt assembly of the fixing device; and
    a controller configured to:
        select a first failure prediction processing mode or a second failure prediction processing mode for predicting a failure of the fixing device based on the detection result of the drive current sensor; and
        select and execute a driving method for the fixing device based on the detection results of the heater temperature sensor and the belt temperature sensor and the acquisition result of the life information acquisition portion in each of the first failure prediction processing mode and the second failure prediction processing mode.

2. The image forming apparatus of claim 1, wherein the heater temperature sensor, the belt temperature sensor, and the drive current sensor are each configured to execute respective detection operations for each print job.

3. The image forming apparatus of claim 1, wherein the controller is configured to:
    count a number of times that a detection value of the drive current sensor becomes smaller than a preset lower limit value; and
    execute the first failure prediction processing mode in response to the number of counts exceeding a predetermined threshold number.

4. The image forming apparatus of claim 1, wherein the controller is configured to select the first failure prediction processing mode or the second failure prediction processing mode based on a rate of change in the detection value of the drive current sensor for each print job.

5. The image forming apparatus of claim 1, wherein the controller is configured to:
    count a number of times that a detection value of the drive current sensor becomes larger than a preset upper limit value; and
    execute the second failure prediction processing mode in response to the number of counts exceeding a predetermined threshold number.

6. The image forming apparatus of claim 1, wherein the controller is configured to:
    determine a temperature difference between a detection value of the heater temperature sensor and a detection value of the belt temperature sensor; and
    in the first failure prediction processing mode or the second failure prediction processing mode, select the driving method for the fixing device based on the acquisition result of the life information acquisition portion in response to the temperature difference not exceeding a preset reference value.

7. The image forming apparatus of claim 6, wherein, in the first failure prediction processing mode or the second failure prediction processing mode, the controller is configured to select and execute a maintenance mode for performing maintenance on the fixing device in response to a determination that a life of the fixing belt assembly is not exceeded.

8. The image forming apparatus of claim 7, wherein the controller is configured to determine whether or not the fixing device is in an abnormal state based on a second detection result of the drive current sensor after executing the maintenance mode.

9. The image forming apparatus of claim 8, wherein the controller is configured to deactivate the heater and stop rotation of the pressure roller in response to a determination that the fixing device is in the abnormal state.

10. The image forming apparatus of claim 8, wherein the controller is configured to stop a print operation and provide a notification to a user in response to a determination that the fixing device is in the abnormal state.

11. The image forming apparatus of claim 7, wherein the controller is configured to rotate the fixing belt in a reverse direction in the maintenance mode.

12. The image forming apparatus of claim 1, wherein the life information includes at least one of (a) a total drive time of the fixing belt assembly, (b) a total number of prints of the image forming apparatus, or (c) a total number of rotations of the fixing belt assembly.

13. The image forming apparatus of claim 12, wherein the life information includes the total drive time of the fixing belt assembly.

14. The image forming apparatus of claim 1, wherein the controller is configured to:
    determine whether a life of the fixing belt assembly has been exceeded in the first failure prediction processing mode or the second failure prediction processing mode;
    in response to selection of the first failure prediction processing mode, reduce the drive current in response to a determination that the lift of the fixing belt assembly has been exceeded; and in response to selection of the second failure prediction processing mode, reduce the drive current and reduce a pressure applied by the pressure roller on the fixing belt in response to the determination that the life of the fixing belt assembly has been exceeded.

15. A method of controlling an image forming apparatus comprising:
- detecting a temperature of a heater of a fixing device, the heater being positioned to heat a fixing belt of the fixing device;
- detecting a temperature of the fixing belt;
- detecting a drive current of a drive motor that drives a pressure roller that pressurizes the fixing belt;
- acquiring life information of the fixing belt assembly;
- selecting a first failure prediction processing mode or a second failure prediction processing mode for predicting a failure of the fixing device based on the drive current of the drive portion; and
- selecting and executing a driving method for the fixing device based on (a) the temperature of the heater, (b) the temperature of the fixing belt, and (c) the life information of the fixing belt assembly in each of the first failure prediction processing mode and the second failure prediction processing mode.

* * * * *